(No Model.)
W. H. MAPLE.
Car Coupling.
No. 238,137.        Patented Feb. 22, 1881.
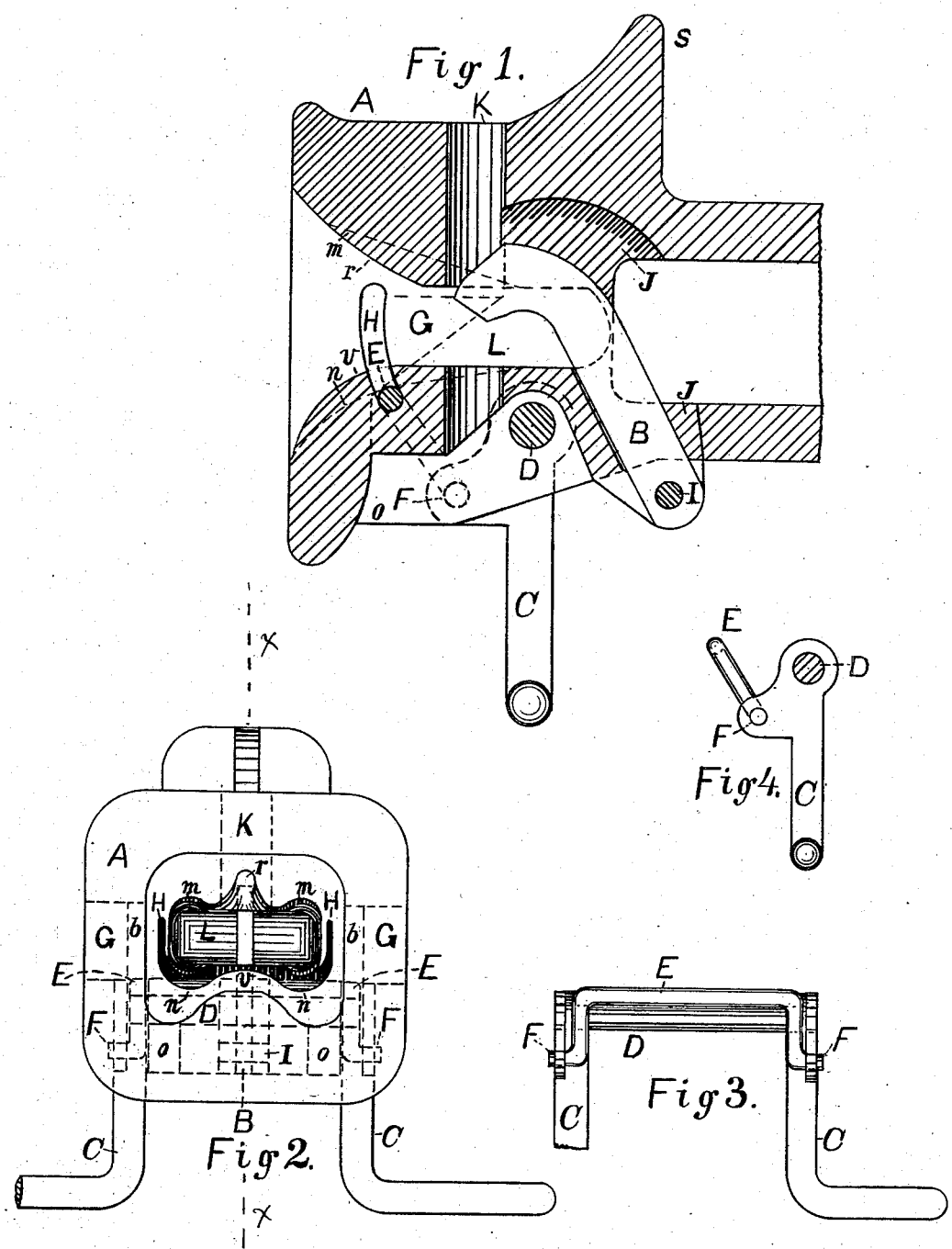
Witnesses
John W. Ulm
O. A. Page
Inventor.
William H. Maple.

UNITED STATES PATENT OFFICE.

WILLIAM H. MAPLE, OF OTTUMWA, IOWA.

CAR-COUPLING.

SPECIFICATION forming part of Letters Patent No. 238,137, dated February 22, 1881.

Application filed October 25, 1880. (No model.)

*To all whom it may concern:*

Be it known that I, WILLIAM H. MAPLE, of Ottumwa, in the county of Wapello and State of Iowa, have invented a new and Improved Car-Coupling; and I declare that the following is a full, clear, and exact description of the same, reference being had to the accompanying drawings, forming a part of this specification.

My invention is of that form of car-coupling in which a common oblong-shaped link, of any length desired, and a pin of suitable form and size are used to connect the draw-heads to be coupled.

It consists, principally, of the improved construction of the draw-head, a lifting-rod for raising and guiding the link, a rock-shaft with handles rigidly attached and suitably connected with the lifting-rod, and the combination, with these parts, of others, substantially as set forth herein.

In the drawings, Figure 1 is a sectional plan view on the line $x\ x$, Fig. 2. Fig. 2 is a front view of the device. Fig. 3 is a front view of the rock-shaft, handles, and lifting-rod, with the handles secured to the shaft, and the lifting-rod connected with the handles by means of its pivotal bearings at its ends; and Fig. 4 represents the same parts shown in Fig. 3 as they appear from the sides of the device.

The object of my invention is to provide a cheap and effective means of guiding the link of one draw-head into the mouth of an adjacent one in effecting couplings without the necessity of placing the hand of the operator between the approaching bumpers, and to therewith provide an automatic pin and the other advantages shown.

In making couplings with the draw-heads now generally in use it is necessary for the operator to take the link in his hand when guiding it. To obviate the danger attending this method a stick is sometimes used to raise and guide the link. Many objections exist to the use of the stick, such as getting caught and broken between the bumpers, getting misplaced or lost, the inconvenience of carrying it on the person, &c.

Now, by the use of the lifting-rod and handles, as shown, I supply a means of lifting and guiding the link similar to that afforded by the stick without the danger and inconvenience referred to. The lifting-rod and handles in my device are permanently attached to the draw-head, and so placed within and contiguous to the draw-head as to be protected from breakage.

In the drawings, A represents my draw-head, which is provided with a curved slot, H, extending laterally through the draw-head between the coupling-pin and the front end. This slot is adapted to receive the lifting-rod E and retain the same in place as it is raised or lowered in manipulating the link. It is of such a degree of curvature as to permit the rod, as it is raised or lowered in guiding the link, to describe the same curve as does the part of the link in contact with such rod, thus preventing any friction between the parts in contact, and making the link much easier to raise than with any other form of slot, and also preventing it from being moved from the straightforward direction required when being manipulated by the rod.

Through the lower portion of the draw-head, and to the rear of the coupling-pin, I pass the rock-shaft D, and provide this shaft with crank-shaped handles C at each end thereof. These handles may be of any suitable form, and are adapted to connect themselves with the ends of the lifting-rod when the device is put together by means of the holes F, which receive the said ends and constitute their pivotal bearings.

The link-chamber L of my draw-head is so formed that in front of the coupling-pin, both at its lower and upper bearings, there are triangular-shaped longitudinal ridges, (shown by $r$ and $v$, and by the lines $m$ and $n$ in Figs. 1 and 2.) These ridges, immediately in front of the pin-opening, may be as wide as the diameter of the pin used, and should run to a point, or nearly so, as they extend forward. Their object is to reduce the exposure of the pin, between its supports, to the minimum, (the distance between the supports depending on the thickness of the coupling-link used,) and at the same time to permit suitable lateral play for the front end of the link when the link is in an elevated or lowered position.

To make up the strength lost to the front or buffer end of my draw-head by reason of the slot H, I brace the walls in front of such slot by means of drooping bracket-shaped portions of metal, as indicated by G in Figs. 1 and 2. These brackets will have their footings in the lateral projections of a portion of the draw-head, above the same, and be of such thickness as to leave the cavities b b, Fig. 2, between the same and the sides of the draw-head below the upper line of the bracket. These cavities, it will be seen, will allow the upward and downward movements of the cranked portion of the lifting-rod as freely as though the brackets were not used.

In order to provide for the automatic dropping of the pin into place, I use the toggle B, which is pivoted, near its lower end, to the draw-head by means of the bolt I, and allowed suitable rearward movement at its top end by means of the cavity J in the draw-head.

It is obvious that when the toggle is in the position shown in Fig. 1 and a coupling-pin is placed in the hole K, the pin will rest on the toggle.

It is also obvious that when the link of an adjacent draw-head enters the draw-head shown, the upper end of the toggle will be pushed from under the pin, permitting the latter to drop through the link into its proper rest and effect the coupling. When the pin is raised above the toggle, the latter, by its own gravity, drops again into the position shown.

I also provide my draw-head with a stop-block, S, on its top side, to strike the dead wood or body of the car when the draw-bar spring is compressed, thus protecting the spring, and also preventing the draw-bar from being driven under the car, to the damage of my handles and other attachments at the sides of the draw-head.

The portion of the draw-head below the link-chamber may be made solid; but I construct it with a central cavity, allowing only the side walls to extend down so as to form jaws o o, Figs. 1 and 2, to receive the shaft D, and to brace the lower portion of the front of the draw-head.

The lifting-rod E is made from a single rod of iron by being bent at right angles at four points, as shown in Fig. 3.

The draw-bar may be made of either cast or wrought iron, or of steel, and the rear portion or shank may be of such form as to suit the draft attachments of any car.

The lifting-rod, shaft, and handles may be made of either malleable or wrought iron, or of any suitable material.

In constructing the draw-head out of cast iron or steel the cavities may be cored out, and the lifting-rod and other parts, after being fully formed, may be readily placed in position. One handle at least must be made in a separate piece, and may be secured to the end of the shaft by a suitable key.

My device operates as follows: A link and pin are placed in the draw-head of one car, while only a pin is placed in the adjacent one and left resting on the toggle B. The operator takes hold of one of the handles of the draw-head containing the link, and as the cars come together the handle is pressed forward. This movement of either handle (both being rigidly attached to the rock-shaft) rocks the shaft and causes the lifting-rod, and with it the link, to be raised to the desired height to enable the link to enter the draw-head of the adjacent car. When the link enters, as before shown, it pushes the toggle from under the pin and effects the coupling. The shape of the lower portion of the draw-head mouth is such (see here also the ridge v, before referred to) that the link by its own gravity seeks a straightforward direction, and when raised will enter the opposing draw-head. If, however, (as may occasionally be the case on a sharp curve,) the draw-heads are not sufficiently in line to enable the link in this position to enter the opposing draw-head, the front end of the link may be moved sidewise, as desired; or, by suitable mechanism, the shaft D may be so constructed as to readily be moved endwise by pressing or pulling on the handles, thus giving the lateral movement to the front end of the link.

In the device as shown the handles are near the sides of the draw-head. I however contemplate, if desired, extending the shaft on one or both sides, so as to place the handles nearer the sides of the car; or handles may be attached to the frame-work of the car, near the corners, and connected with my rock-shaft by suitable mechanism.

I am aware that a car-coupler has heretofore been constructed having a lateral slot through the front end of the draw-head, and a stirrup or rod working in such slot for the purpose of holding the coupling-link in a horizontal position for self-coupling; but said slot was straight, and not, therefore, adapted to permit said rod to describe a curve coinciding with the curve described by the part of the link in contact therewith, as in my device, and said stirrup was not connected with handles for readily raising or lowering the link, so as to enable it to enter the draw-head of an approaching car higher or lower than the car to which the device might be attached. Again, the draw-head in the said device was not provided with the braces G to strengthen the walls in front of the slot, which are necessary to give sufficient strength to the bunter end of the draw-head to enable it to withstand the concussion when the cars are violently driven together, as they often are when making couplings. I am also aware that a draw-head has been made heretofore with an elevation or abutment on the bottom of the link-chamber, similar to the ridges r and v in my draw-head; but said abutment was doubly inclined, and hence not adapted to form a bearing for an ordinary straight coupling-pin passing perpendicularly through the draw-head. This abutment was also only placed on the bottom of the link-chamber, and not both on the bottom and top, as in my device. In said device the single abutment was used merely to provide a hold for the lower end of a pin pivoted to the upper part of the draw-head, and not for the purpose of reducing the distance between the bearings of a common coupling-pin, as in my device. I therefore disclaim both of said constructions.

Having thus described my invention, what I claim as new, and desire to secure by Letters Patent, is—

1. A draw-head for cars, provided with the curved vertical slot H, in combination with the lifting-rod E and handles C, substantially as described, and for the purposes set forth.

2. The triangular-shaped longitudinal ridges r and v in front of the pin-opening of a draw-head, for the purposes set forth.

3. The braces G, supporting the wall of the draw-head A, in front of the slot H, as shown and described.

WILLIAM H. MAPLE.

Witnesses:
 JOHN W. ULM,
 O. A. PAGE.